US 6,694,806 B2

(12) United States Patent
Kumagai et al.

(10) Patent No.: US 6,694,806 B2
(45) Date of Patent: Feb. 24, 2004

(54) VEHICLE STATE ANALYSIS SYSTEM AND ITS ANALYSIS METHOD

(75) Inventors: Satoshi Kumagai, Nagano (JP); Takao Hamuro, Nagano (JP); Hideki Nagahara, Nagano (JP)

(73) Assignee: Miyama, Inc., Nagano (JP)

( * ) Notice: Subject to any disclaimer, the term of this patent is extended or adjusted under 35 U.S.C. 154(b) by 303 days.

(21) Appl. No.: 09/954,196

(22) Filed: Sep. 18, 2001

(65) Prior Publication Data

US 2002/0056314 A1 May 16, 2002

(30) Foreign Application Priority Data

Sep. 20, 2002 (JP) ........................................ 2000-284804

(51) Int. Cl.[7] ............................................. G01M 15/00
(52) U.S. Cl. ......................................................... 73/113
(58) Field of Search ........................ 73/113, 114, 116, 73/117, 117.1, 117.2, 117.3

(56) References Cited

U.S. PATENT DOCUMENTS 6,453,731 B1 * 9/2002 Yaegashi ...................... 73/113

2001/0049936 A1 * 12/2001 Kenneth et al. ............... 60/299
2002/0055407 A1 * 5/2002 Druten et al. ................ 475/207
2002/0156568 A1 * 10/2002 Knott et al. ................ 73/23.31

FOREIGN PATENT DOCUMENTS

JP          2000-205925          7/2000

* cited by examiner

*Primary Examiner*—Edward Lefkowitz
*Assistant Examiner*—Maurice Stevens
(74) *Attorney, Agent, or Firm*—Rabin & Berdo, P.C.

(57) ABSTRACT

An engine performance map which specifies the relation between running conditions and brake specific fuel consumption (BSFC) is generated by estimating the BSFC relative to the engine rotation speed and accelerator depression amount, based on the BSFC characteristics predicted from the torque pattern of the vehicle being analyzed and the optimum BSFC. A vehicle mounted unit 1 computes the BSFC of the engine by looking up the engine performance map based on the engine rotation speed and accelerator depression amount, and computes the fuel consumption rate based on this BSFC.

15 Claims, 5 Drawing Sheets

VEHICLE STATE ANALYSIS SYSTEM AND ITS ANALYSIS METHOD

FIELD OF THE INVENTION

This invention relates to the system for analyzing a vehicle state such as fuel consumption rate, and its analysis method.

BACKGROUND OF THE INVENTION

JP-A-2000-205925 published by the Japanese Patent Office in 2000 discloses a fuel cost-performance display device which computes a fuel consumption amount based on a fuel injection pulse signal output from an engine control unit, computes a running distance based on a vehicle speed pulse signal output from a vehicle speed sensor, and computes and displays a fuel consumption rate by dividing the computed running distance by the fuel consumption amount.

SUMMARY OF THE INVENTION

However, the aforesaid device uses a fuel injection pulse signal for the computation of the fuel consumption rate, i.e., it assumes a vehicle equipped with an electronic fuel injection device (EGI), and cannot be applied to a non-EGI vehicle or a diesel engine which does not have a fuel injection pulse signal.

A method exists for computing a fuel consumption rate of a non-EGI vehicle or a diesel engine, wherein a BSFC (brake specific fuel consumption) is calculated by looking up an engine performance map which specifies the relation between running conditions such as the engine rotation speed and the brake specific fuel consumption, and computing the fuel consumption based thereon. However, normally such a map is not available, and even if it is, it is difficult to acquire. Also, if the device is fitted later by a retail shop, it must be adapted to various types of vehicle from different manufacturers, and it is practically almost impossible to prepare such engine performance maps individually for every vehicle.

It is therefore an object of this invention to make it possible to precisely compute fuel consumption rate without using a fuel injection pulse signal in a system for analyzing vehicle states. It is a further object of this invention to provide a subjective evaluation criterion of vehicle state by displaying a vehicle state including fuel consumption rate to a driver or manager.

In order to achieve above object, this invention provides a vehicle state analysis system for a vehicle with an engine, comprising means for estimating a brake specific fuel consumption under remaining running conditions based on generic brake specific fuel consumption characteristic data and a known actual brake specific fuel consumption under a certain running condition of the engine, and for generating an engine performance map which specifies the relation between the running conditions and the brake specific fuel consumption, means for computing the brake specific fuel consumption of the engine by looking up the engine performance map based on the running conditions of the vehicle being analyzed, means for computing a fuel consumption amount from the computed brake specific fuel consumption and engine output, and means for computing the fuel consumption rate from the computed fuel consumption amount and vehicle running distance.

Therefore, according to this invention, the engine performance map which specifies the relation between the running state (accelerator depression amount and engine rotation speed, or throttle opening and engine rotation speed) and the brake specific fuel consumption (BSFC), is automatically generated based on previously prepared generic BSFC characteristic data and the actual BSFC under a certain running condition of the engine to the analyzed. BSFC characteristic data is data showing how the BSFC varies according to the running conditions, and it is the ratio of the BSFC under other running conditions to the BSFC under a certain running condition (for example, the running condition under which the BSFC is a minimum) which is stored. In the analysis, the BSFC is calculated by looking up the generated engine performance map, and the fuel consumption amount and fuel consumption rate are computed thereupon.

The reason why the engine performance map can be automatically generated is that the BSFC characteristics are approximately independent of the engine type, so if generic BSFC characteristics which show how the BSFC varies according to running conditions, and the actual BSFC under a certain running condition are known, all the BSFC under the remaining running conditions may be estimated based on this actual BSFC.

Moreover, as the BSFC characteristics are effectively identical in engines having similar torque parameters, if several BSFC characteristic data are provided corresponding to representative torque parameters, and the BSFC characteristic data is selected from the engine torque parameters of the vehicle being analyzed, any engine performance map can be generated more accurately, and the current computational precision of fuel consumption rate can be further enhanced.

Also, if an optimum BSFC acquired from a catalogue or the like is used as the actual BSFC which serves as a reference when the BSFC is estimated under various running conditions, it is unnecessary to measure the actual BSFC for each type of vehicle.

Therefore, as the analysis system according to this invention does not require a fuel injection pulse signal for the computation of fuel consumption rate, the fuel consumption rate may be calculated in a non-EGI vehicle or vehicle with a diesel engine which do not have a fuel injection pulse signal, and the method can be applied to the analysis of the vehicle running states of all types of vehicles. Further, as the engine performance map can be automatically generated from pre-prepared BSFC characteristic data and data extracted from a catalogue, there is no need to provide an engine performance map for various types of vehicle from different automobile manufacturers, and the generality of the analysis system is enhanced.

The detail as well as other features and advantages of this invention are set forth in the remainder of the specification and are shown in the accompanying drawings.

DESCRIPTION OF THE PREFERRED EMBODIMENTS

Figure 1:
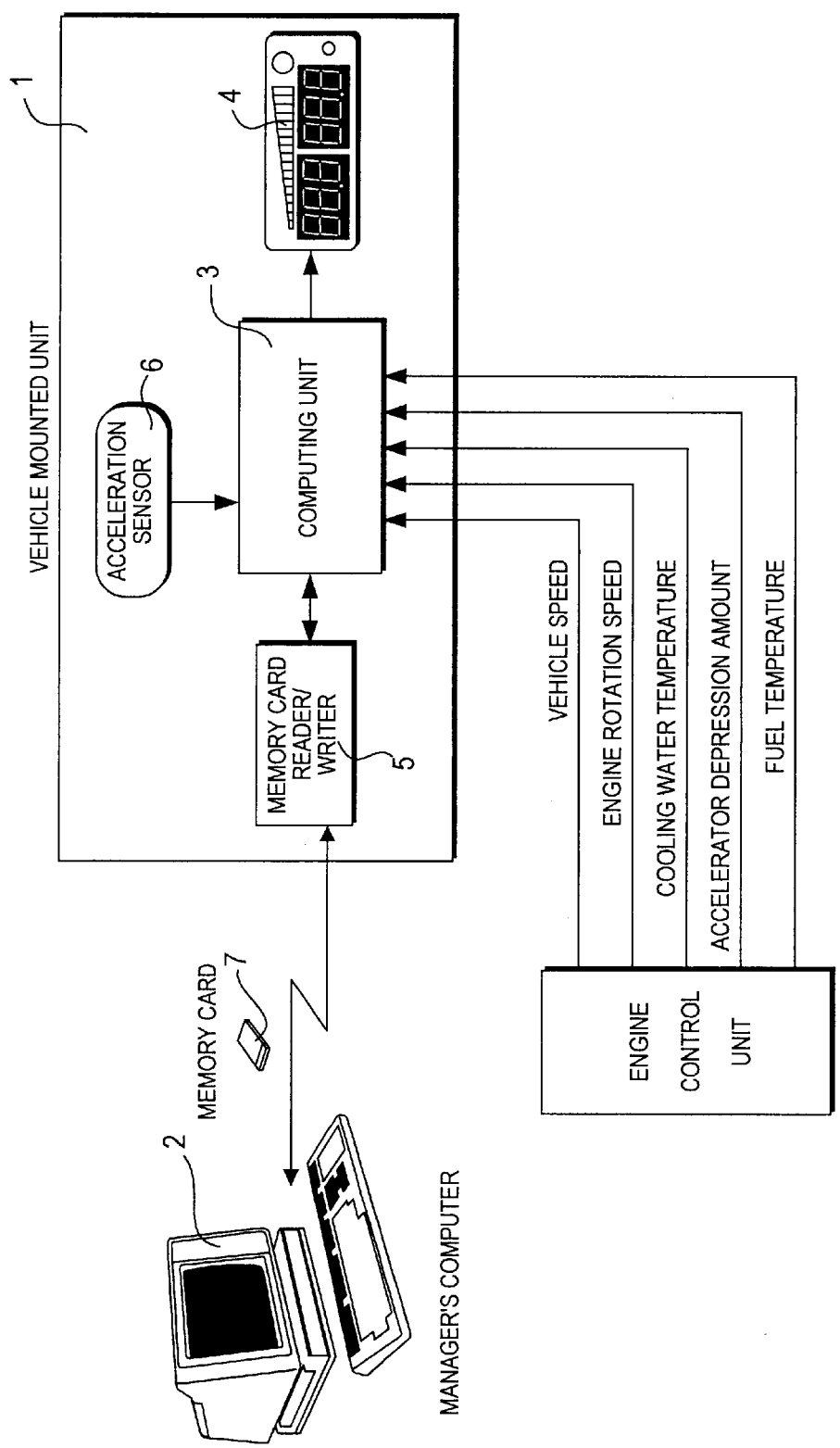
FIG. 1 is a block diagram showing the construction of a vehicle state analysis system according to this invention.

Referring to FIG. 1 of the drawings, a vehicle state analysis system according to this invention comprises a vehicle mounted unit 1 which is mounted on the vehicle to be analyzed, and a manager's computer 2 which manages the vehicle.

The vehicle mounted unit 1 comprises a computing unit 3, display 4, memory card reader/writer 5 and acceleration sensor 6. The display 4 is fitted at a position which is easily seen by the driver.

Vehicle output signals including a vehicle speed signal, engine rotation speed signal, engine cooling water temperature signal, accelerator depression amount signal and fuel temperature signal, and an acceleration signal from the acceleration sensor 6, are input to the computing unit 3. The vehicle output signals can be obtained from an engine control unit 8, and may also be obtained directly from sensors which output these signals without passing through the engine control unit.

The computing unit 3 computes vehicle running states such as fuel consumption rate or excess drive force based on the above signals, a vehicle data signal read from a memory card 7, and an engine performance map. The computed vehicle state is displayed on the display 4 and recorded on the memory card 7 by the memory card reader/writer 5.

Figure 2A:
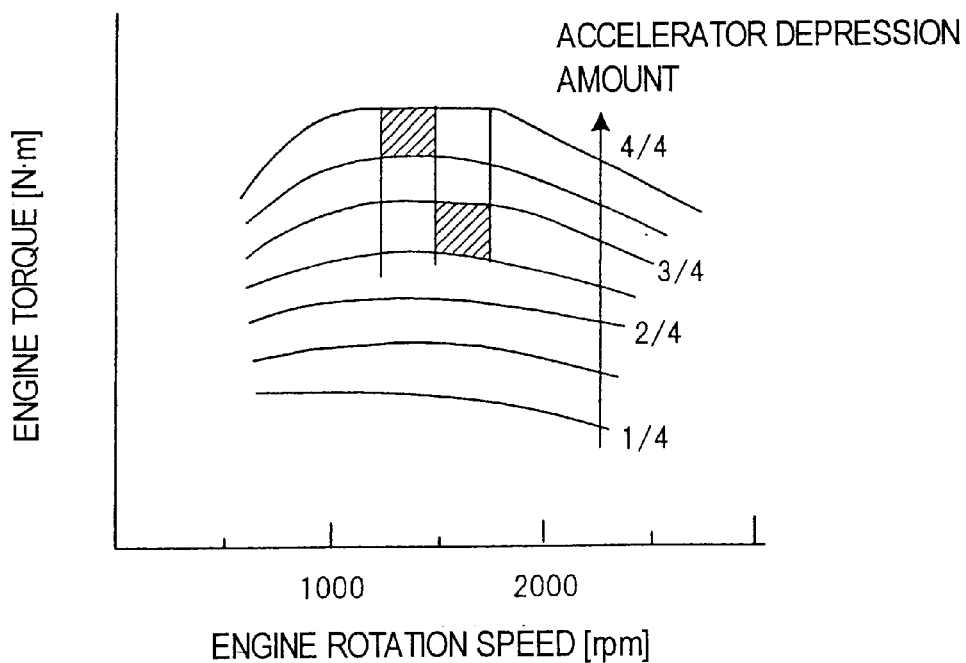
FIG. 2 is a diagram describing an engine performance map.
Figure 2B:
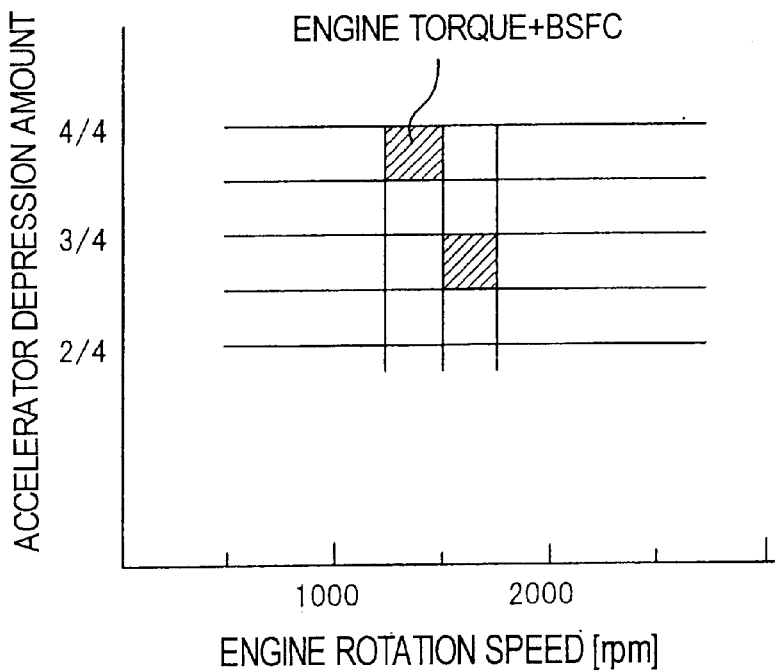

Usually, the engine performance map is a map which indicates the brake specific fuel consumption (BSFC) relative to the engine rotation speed and engine torque as shown in FIG. 2A. The BSFC for each engine rotation speed and engine torque is stored in the corresponding squares. However, it is then necessary to compute each engine torque to calculate the BSFC, which is inconvenient. In this regard therefore, in this embodiment, a rearranged engine performance map is used. In this rearranged engine performance map, the vertical axis is taken as the accelerator depression amount (or throttle opening), the horizontal axis is taken as the engine rotation speed as shown in FIG. 2B, and the engine torque and BSFC are stored in each square.

A vehicle database and management software are installed in the manager's computer 2. The manager's computer 2 exchanges various types of data required for analyzing the vehicle state with the vehicle mounted unit 1 via the memory card 7 which is a read/write recording medium, and the computation result of the vehicle state recorded when the vehicle is running.

The manager's computer 2 automatically generates the engine performance map for the vehicle being analyzed, records data required to compute the vehicle state and the engine performance map on the memory card 7, analyzes/displays data recorded on the memory card 7 by the vehicle mounted unit 1, and corrects the engine performance map based on the fuel amount supplied when fuel is supplemented.

Hereafter, the details of the system will be described in detail.

1. Setting of data for the vehicle being analyzed

When vehicle state is analyzed by this system, firstly, corresponding to the vehicle to be analyzed, the manufacturer, vehicle type, years of service, engine shape, idle rotation speed, total vehicle weight, gear ratio of final reduction gear, type of wind deflector and body shape and tire size, are selected from the vehicle database by the operator of the manager's computer 2.

When the selection is finished, data for the vehicle to be analyzed such as engine rotation pulse speed (relation between engine rotation speed and engine rotation pulse number), and vehicle speed pulse number (relation between vehicle speed and vehicle speed pulse number) are automatically selected from the vehicle database. The selected data are written on the memory card 7.

Of the selected data, engine performance data and vehicle body characteristic data can be extracted from the catalogues or service manuals supplied by the automobile manufacturer, so this data does not need to be obtained by running the vehicle and performing experiments when the vehicle database is built. Also, the engine rotation pulse number and vehicle speed pulse number may easily be acquired from the output signal of the engine control unit mounted on the vehicle.

In the manager's computer 2, to generate the engine performance map, torque patterns for the vehicle being analyzed are looked up by comparing with representative torque patterns for several vehicle types which are previously provided, based on the torque data of the vehicle which is stored in the vehicle database.

The BSFC of engines with similar torque patterns have identical characteristics regardless of the engine type (exhaust gas amount, etc.), so BSFC characteristics corresponding to the torque pattern of the vehicle being analyzed are selected from the BSFC characteristic data for the representative torque patterns which are previously provided, and the BSFC characteristics are calculated. BSFC data is data showing how the BSFC varies according to running conditions, and the ratio of the BSFC under other running conditions relative to the BSFC under a certain running condition (here, the running condition at which the BSFC is optimum), is stored.

By combining this selected generic BSFC characteristic data with the optimum BSFC which is the actual value, the BSFC under the remaining running conditions can be computed, and BSFC data for the engine performance map generated.

When the engines of the vehicles being analyzed all have identical torque patterns, only one BSFC characteristic data needs to be provided, and the above torque pattern comparison is unnecessary.

Figure 3:
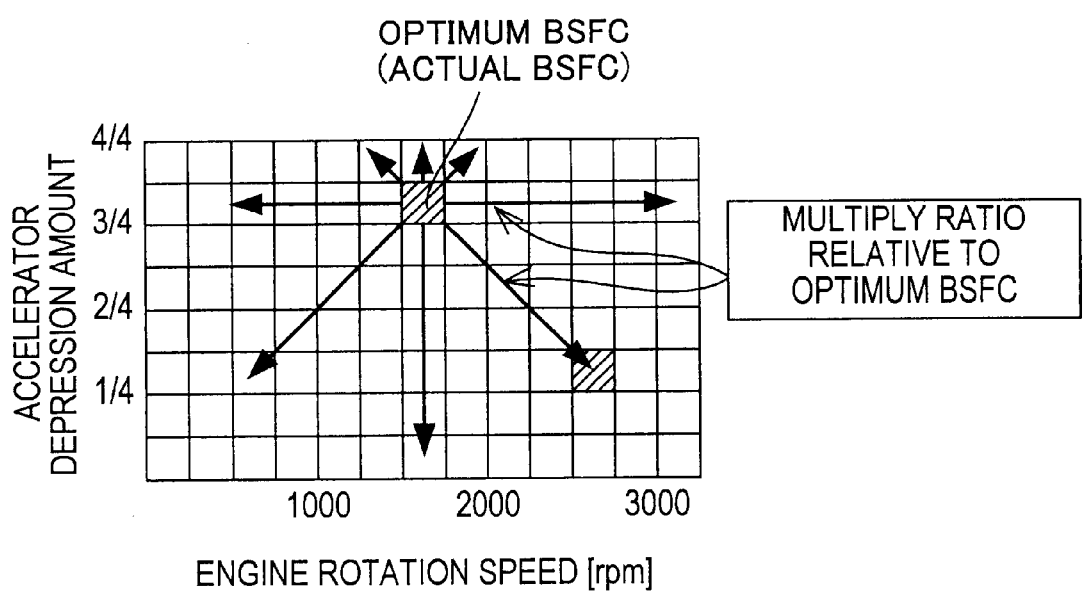
FIG. 3 is a diagram schematically showing how BSFC data of an engine performance map is automatically generated.

FIG. 3 shows how the BSFC data of the engine performance map is automatically generated. As described above, if the torque pattern is known, the BSFC characteristic of the engine is also known, and if an optimum BSFC which is a real value is supplied, the BSFC under all running conditions can be calculated by multiplying by a ratio relative to this. The torque data for the engine performance map can be calculated from the engine output characteristics which are stored in the vehicle database.

In this way, the engine performance map which comprises the BSFC data and engine torque data is automatically generated, and the generated map is recorded on the memory card 7.

Various data required to compute the vehicle state are written on the memory card 7, the memory card 7 is inserted in the memory card reader/writer 5 of the vehicle mounted unit 1, and various data required to compute the vehicle state are read by the vehicle mounted unit 1.

2. Initialization of sensors and correction of engine performance map

When reading of the required data is complete, the accelerator depression amount sensor and acceleration sensor 6 are initialized. The accelerator depression amount sensor may for example be initialized by detecting the sensor output value when the accelerator pedal is fully depressed and when it is not depressed. The acceleration sensor 6 may for example be initialized by using a level vial attached to the vehicle mounted unit 1.

When the initialization of the acceleration sensor 6 is complete, the vehicle is then operated, and the torque data of the engine performance map is corrected based on the data measured at this time. This correction must be performed because there is a difference between the catalogue performance and the actual performance of the engine, and it is necessary to correct this discrepancy to compute a precise vehicle state. This correction is performed on data measured when the vehicle is first run after fitting the vehicle mounted unit 1 to the vehicle.

Specifically, torque data is computed when the vehicle is run on full throttle under a first trace condition (accelerator depression amount is greater than 70%), and accelerator depression amount and engine rotation speed are measured at the specified torque when the vehicle is run under a second trace condition (accelerator depression amount is between 30% and 70%). Both trace conditions are set for a road gradient of zero, water temperature specification value, acceleration state and empty state, and the engine torque is given by the following equation (1):

$$Te = \frac{R \cdot r}{it \cdot if \cdot \eta} \quad (1)$$

R is a running resistance [N] computed using equations (2)–(7) described later, r is a dynamic loaded tire radius [m], it is the speed ratio in the gear position at this time, if is the reduction ratio, and η is the motor efficiency.

The torque data of the engine characteristic map is corrected based on the comparison of this measured data and the engine performance map. Hence, by performing the correction based on running data under full load and partial load, the torque data of the engine performance map may be corrected to a considerably precise value.

3. Computation of the vehicle state based on running data

When the engine performance map having precise torque data has been obtained in this way, computation of the vehicle state starts. The computation involves computing the excess drive force and fuel consumption rate (average fuel consumption rate, instantaneous fuel consumption rate), and determining hard braking/hard acceleration which have a large impact on the fuel consumption amount. Specifically, basic data is first computed, and the vehicle state is computed using the computation result of this basic data.

3.1 Computation of basic data

The basic data used in computing the vehicle state are a rolling resistance coefficient μr, a running resistance R and a drive force F.

The rolling resistance coefficient μ is a value used when computing a rolling resistance Rr described later, and varies according to the road surface condition (dry, wet, moist or snow), the type of tire and the degree of wear. The measurement of the data used in computing the rolling resistance coefficient μr is performed when the accelerator depression amount is 0% and the clutch is released. For example, if settings are made so that this measurement is performed at the moment of a shift change (a short time, but satisfying the aforesaid conditions), the data required to compute the rolling resistance coefficient μr can be measured without requiring the driver to run the vehicle in a special way for this data measurement. Specifically, the rolling resistance coefficient μr is computed by the following equation (2), based on a speed v1 [m/sec] when deceleration starts and a speed v2 [m/sec] after a predetermined time Δt.

$$\mu r = \frac{1}{g} \cdot \frac{v1 - v2}{\Delta t} \quad (2)$$

g in the equation (2) is the gravitational acceleration (=9.8 [m/s²]) (idem in the following equations).

Next, the running resistance R[N] is computed from a hill-climbing resistance Rs[N], an acceleration resistance Ra[N], an air resistance Rl[N] and the rolling resistance Rr[N] by the following equation (3):

$$R = Rr + Rl + Rs + Ra \quad (3)$$

The hill-climbing resistance Rs is computed by the following equation (4):

$$Rs = W \cdot g \cdot \sin \theta \quad (4)$$

θ is a gradient angle calculated from the difference between the acceleration detected by the acceleration sensor 6 which includes the acceleration in the vertical direction, and the longitudinal acceleration al[m/s²] of the vehicle computed based on the vehicle speed speed V[m/sec]. W[kg] is the gross vehicle weight.

The acceleration resistance Ra is the resistance due to inertia acting on the vehicle when it is accelerating or decelerating, and is computed by the following equation (5), based on the longitudinal acceleration al[m/s²] and the gross vehicle weight W[kg].

$$Ra = al \cdot W \quad (5)$$

The air resistance Rl is the resistance due to collision between the vehicle and air when it is running, and is computed by the following equation (6) based on the air density ρ[kg/m³], air resistance coefficient Cd, the frontal projected area A[m²] and the vehicle speed V[m/sec].

$$Rl = \frac{1}{2} \cdot \rho \cdot Cd \cdot A \cdot V^2 \quad (6)$$

The rolling resistance Rr is the resistance between the tire and the road surface, and is computed by the following equation (7), based on the rolling resistance coefficient μr and gross vehicle weight W[kg].

$$Rr = \mu r \cdot W \cdot g \quad (7)$$

The drive force F[N] is the force which moves the vehicle due to the power of the engine, and is computed by the following equation (8), based on an engine torque Te[N·m] obtained by looking up the engine performance map, speed ratio it of the gear position which is currently selected, reduction ratio if, transmission efficiency η and dynamic loaded tire radius r[m].

$$F = \frac{Te \cdot it \cdot if \cdot \eta}{r} \quad (8)$$

3.2 Computation of vehicle state

When the basic data has been computed as described above, computation of the excess drive force Fe and fuel consumption rate rf is performed, and determination of hard braking/hard acceleration is performed.

The excess drive force Fex is a value obtained by subtracting the running resistance R from the drive force F transmitted by the engine. If the value of the excess drive force Fex is negative, the vehicle is decelerating, and if it is positive, the vehicle is accelerating. The excess drive force Fex is computed because, if the excess drive force Fex is very large, it can be presumed that an excessively large drive force is operating, and it can be determined that it is necessary to perform a shift-up or reduce the accelerator depression amount to a suitable accelerator depression amount immediately.

To compute a precise excess drive force Fex, the correction of the computation equation is also performed at the same time. Specifically, when the vehicle is running at a fixed accelerator depression amount and fixed engine rotation speed, the state where the rotation speed begins to fall is the state where the excess drive force Fex is zero, and if the calculated excess drive force Fex is not zero when the vehicle has entered this state, the computational equation (8) for drive force F is corrected so that the computed excess drive force Fex is zero.

Also, to compute the fuel consumption rate rf, the engine output Pe[kW] is calculated by the following equation (9), based on the engine torque Te[N·m] obtained by looking up the engine performance map from the engine rotation speed N[rpm] and accelerator depression amount.

$$Pe = \frac{\pi \cdot Te \cdot N}{30} \cdot \frac{1}{1000} \quad (9)$$

The fuel consumption amount Lf[l] is computed by the following equation (10) based on the engine output Pe, the BSFC obtained by looking up the engine performance map based on the engine rotation speed N and accelerator depression amount, the fuel density ρr and the running time T.

$$Lf(l) = \frac{BSFC(g/(kW \cdot h)) \cdot Pe(kW) \cdot T(h)}{\rho r \cdot 1000(g)} \quad (10)$$

The fuel consumption rate rf is computed by following the equation (11), based on the running distance D obtained by analyzing the vehicle speed V from the vehicle speed signal, and the fuel consumption amount Lf.

$$rf(km/l) = \frac{D(km)}{Lf(l)} \quad (11)$$

Here, the fuel consumption rate rf may for example be the average fuel consumption rate over the past ten minutes, or the present instantaneous fuel consumption rate. If the instantaneous fuel consumption rate has the best value compared to past fuel consumption rate data, this value is stored as the optimum fuel consumption rate.

To determine hard braking/hard acceleration, the vehicle longitudinal acceleration a/is calculated based on the variation amount of vehicle speed V, and it is determined that hard braking or hard deceleration was performed if, for example, the vehicle longitudinal acceleration al exceeded ±0.78 [m/s$^2$].

3.3 Data correction when the vehicle is stationary

The vehicle state is computed as described above, and to compute a precise vehicle state, it is assumed that the data used for the computation are precise. However, when the vehicle is stationary, it may occur that the density or viscosity of the fuel vary according to variation of fuel temperature or the fuel supplied, and the gross vehicle weight W and rolling resistance coefficient μr vary under a load variation. In this regard, if the vehicle has remained stationary from more than a predetermined time (e.g., more than ten minutes), these data are corrected.

Specifically, the gross vehicle weight W is computed by the following equation (12) based on running data measured when the following conditions are satisfied after the vehicle has started moving from the stationary state, i.e., the accelerator depression amount is greater than 70%, the gradient angle is zero and the water temperature is a specified value.

$$W = \frac{F - RI}{g \cdot \mu r + \frac{v2 - v1}{\Delta t}} \quad (12)$$

v1 [m/sec] is the speed when acceleration starts, v2 [m/sec] is the speed after a predetermined time Δt[sec], F[N] is the drive force and Rl[N] is the air resistance.

However, the computation result may be less than the gross vehicle weight when it is empty, so if the computed gross vehicle weight W is a value less than the gross vehicle weight when the vehicle is empty, a correction of the gross vehicle weight is not performed.

As density and viscosity of fuel are subject to the effect of fuel temperature, they are corrected based on the detected fuel temperature, and the rolling resistance coefficient μr is computed by the aforesaid equation (2) based on the running data measured during a shift-change as described in "3.1: Computation of basic data".

4. Display/recording of vehicle state

When the vehicle state has been computed as described above, the computation result is displayed in real time by the display 4.

Figure 4:
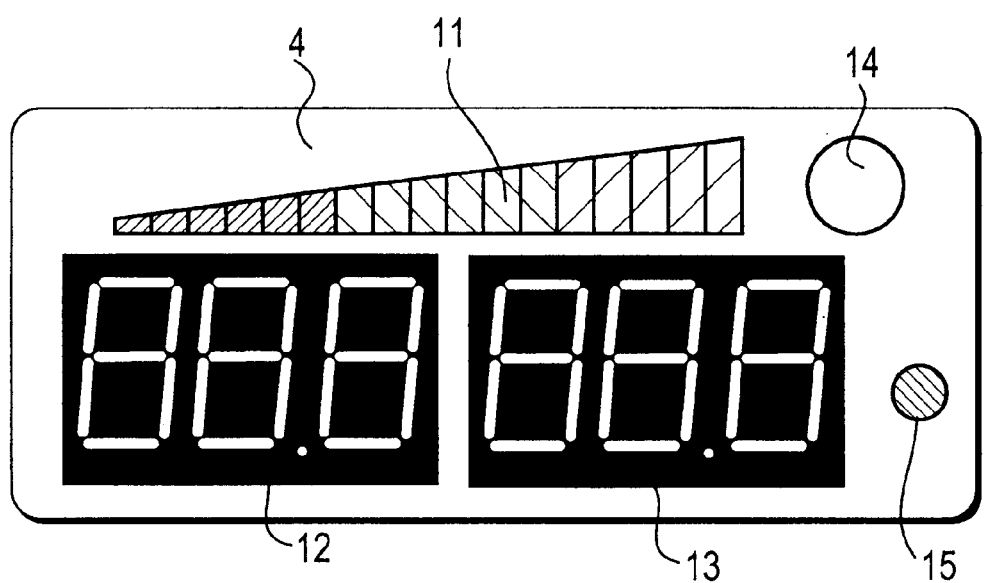
FIG. 4 is a diagram showing the detailed construction of a display of a vehicle mounted unit.

As shown in FIG. 4, the display 4 comprises an excess drive force meter 11, average fuel consumption rate meter 12, instantaneous fuel consumption rate meter 13 and hard braking/hard acceleration warning lamp 14. In the figure, 15 is a power supply lamp.

The excess drive force meter 11 displays the computed excess drive force Fex as a bar graph. It is set so that the display colors change from green through to yellow and red as the excess drive force Fex increases, and is green during recommended running when the excess drive force is less than a target value.

The average fuel consumption rate meter 12 displays the average fuel consumption during the past ten minutes, and the instantaneous fuel consumption rate meter 13 displays the instantaneous fuel consumption at the present time. The best fuel consumption rate may be made to flash on the average fuel consumption rate meter 12 or instantaneous fuel consumption rate meter 13.

When it is determined by the computing unit 3 that hard braking or hard acceleration has been performed (e.g., when the vehicle longitudinal acceleration exceeded ±0.78 [m/sec]), the hard braking/hard acceleration warning lamp 14 lights to warn the driver. Another method may also be used to warn of hard braking/hard acceleration, e.g., by sounding a warning buzzer or warning message.

By providing the display 4 to display the vehicle state, the driver can be made aware of the vehicle state in real time, and can use the information to improve his own driving skill.

5. Analysis of vehicle state

After driving is complete, various data regarding the vehicle state record on the memory card 7 are read by the controlling computer 2, and after various analyses have been performed, the results are displayed on the monitor of the manager's computer 2.

Figure 5:
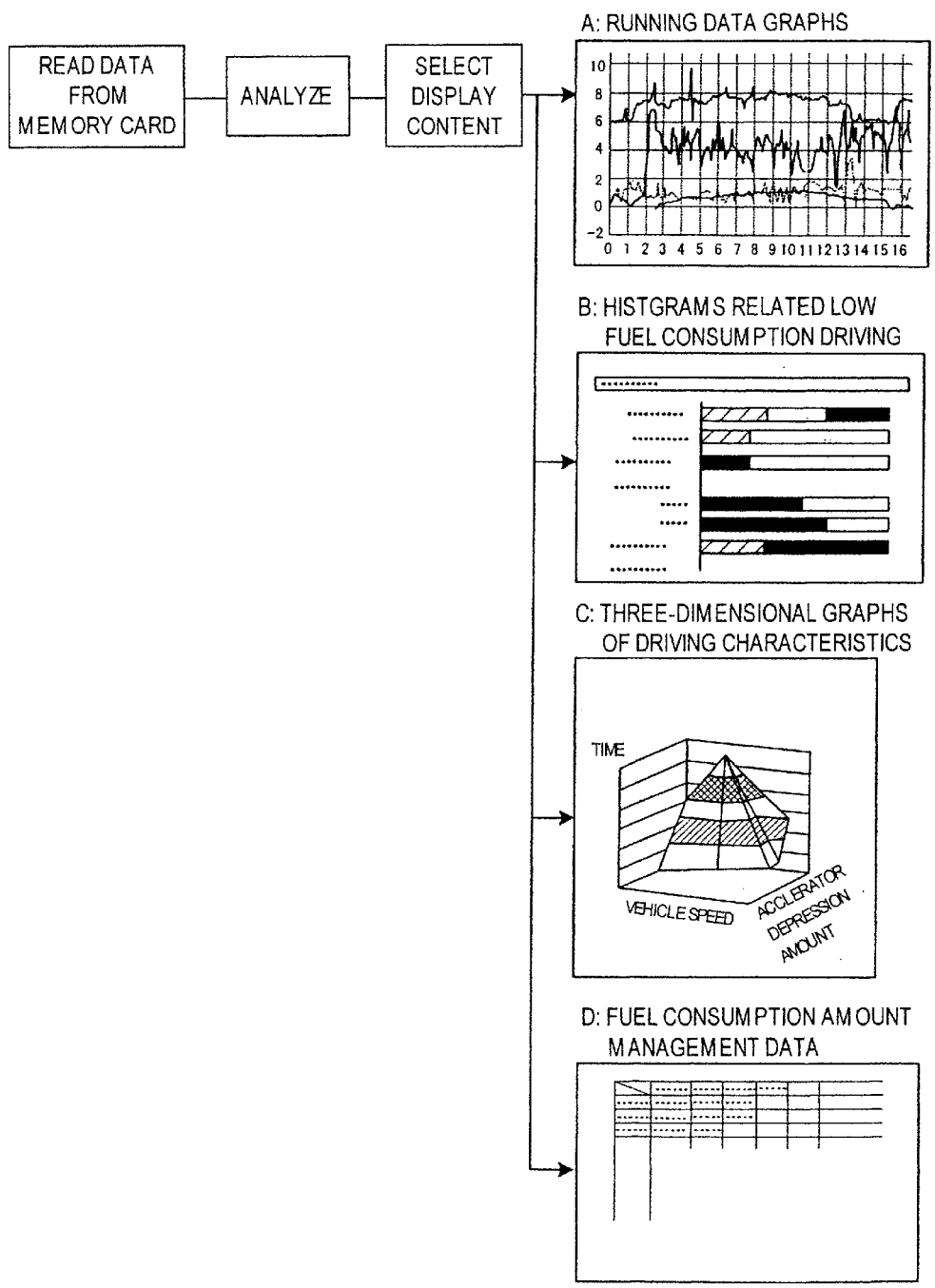
FIG. 5 is a diagram showing the procedure for analyzing a vehicle state.

The information displayed on the monitor comprises "A: RUNNING DATA GRAPHS", "B: HISTOGRAMS RELATED TO LOW FUEL CONSUMPTION DRIVING", "C: THREE-DIMENSIONAL GRAPHS OF DRIVING CHARACTERISTICS", "D: FUEL CONSUMPTION AMOUNT MANAGEMENT DATA", and the contents displayed may be freely selected on the manager's side. FIG. 5 shows the analytical procedure used at this time.

"A: RUNNING DATA GRAPHS" comprises the display items "accelerator depression amount", "engine rotation speed", "vehicle acceleration", "gear position" and "road gradient". These graphs display how these parameters vary with time on the horizontal axis.

"B: HISTOGRAMS RELATED TO LOW FUEL CONSUMPTION DRIVING" comprises the display items "excess drive force", "idle stop", "racing", "coasting deceleration", "hard braking/hard acceleration", "constant vehicle speed running", "speed distribution" and "waveform running analysis".

In "excess drive force" which is one of the display items, the excess drive force is classified under three stages according to the magnitude of the excess drive force (corresponding to the display of the excess drive force meter), and the display shows how much time is occupied by each stage relative to the whole running time.

In "idle stop", it is determined that the vehicle is at an idle stop when for example the engine rotation speed is zero and the stationary time is 120 seconds or more, and the idle stop time when the vehicle is stationary is shown. The fuel consumption amount saved due to this idle stop is also displayed.

In "racing", it is determined that the vehicle is racing when the vehicle speed is zero and an engine rotation speed is greater than 1000 [rpm], and the racing number is displayed. The fuel consumption amount due to racing is also displayed.

In "coasting deceleration", it is determined that the deceleration when the vehicle longitudinal acceleration is within a standard value, is coasting deceleration, and the proportion of the coasting deceleration in the total deceleration is displayed.

In "hard braking/hard acceleration", when the vehicle longitudinal deceleration is larger than a reference value, the situation is determined to be hard braking, and when the vehicle longitudinal acceleration is larger than a reference value, the situation is determined to be hard acceleration (corresponding to the determination of the computing unit 3). The proportion of hard braking in the total braking, and the proportion of hard acceleration in the total acceleration, are displayed.

In "constant vehicle speed running", the vehicle is determined to be running at a constant vehicle speed when a constant vehicle speed is maintained for at least 10 seconds. The proportion of the constant vehicle speed running time in the total running time and proportion of running distance under the constant vehicle speed in the total running distance, are displayed.

In "speed distribution", different speed regions are displayed as a proportion of the total running time (e.g., every 20 [km/h]).

In "waveform running", when the vehicle is running at a constant vehicle speed and this vehicle speed is maintained, how much the vehicle speed is varying is calculated by comparing the difference between this vehicle speed and the real vehicle speed with a threshold value, and this proportion is displayed.

In "C: THREE-DIMENSIONAL GRAPHS OF DRIVING CHARACTERISTICS", the Z axis is taken as time, and the X axis, Y axis display two of the accelerator depression amount, engine rotation speed, vehicle speed and gear position.

In "D: FUEL CONSUMPTION AMOUNT MANAGEMENT DATA", running distance, fuel consumption amount, fuel consumption rate, gross vehicle weight and fuel supply amount are displayed, Hence, the vehicle state can be displayed as it or in an arranged form on the monitor of the manager's computer 2, so the manager can obtain a better grasp of the vehicle state, and can use it as an objective determining means when evaluating the vehicle state. As the vehicle state is shown as a specific number, improved target values or control criteria can also be specifically set. Further, the driver can improve his own driving technique by observing the analysis results which are displayed, and the analysis results for the vehicle state obtained by an experienced driver will also contribute to the training of inexperienced drivers.

Here, some examples of the data displayed on the monitor of the manager's computer 2 were shown, but data other than the data shown here may also be displayed according to the manager's requirements.

In the manager's computer 2, the actual fuel consumption amount was calculated based on data when fuel was supplied, and a comparison was made between this actual fuel consumption amount and the fuel consumption amount found by computation. As a result of this comparison, when the difference between the fuel consumption amount found by computation and the actual fuel consumption amount exceeds a specified value, there is an error in the BSFC data of the engine performance map, so the BSFC data of the engine performance map is corrected. For example, if the actual fuel consumption amount is larger than the fuel consumption amount found by computation, the BSFC values stored in the engine performance map are respectively corrected to large values.

By correcting the engine performance map based on the fuel supply amount when extra fuel is supplied, a precise engine performance map which reflects the effect of individual vehicle differences and of time-dependent deterioration can be obtained, and the computational precision of the vehicle state on the next occasion the vehicle is running can be further enhanced.

In the preceding embodiment, the aforesaid construction is an example of systems to which the invention is applied, but the invention is not limited thereto, and may be applied also to systems having a different construction from that shown here. For example, the vehicle database may be incorporated in the vehicle mounted unit 1, and data selection or automatic generation of the engine performance map performed by the vehicle mounted unit 1. Further, the analysis and display of the recorded vehicle state may also be performed by the vehicle mounted unit 1.

Exchange of data between the vehicle mounted unit 1 and controlling computer 2 may also be performed by methods other than transfer to the memory card 7, for example it can be transferred to a magnetic disk or transferred by radio communications.

The embodiments of this invention in which an exclusive property or privilege is claimed are defined as follows:

What is claimed is:

1. A vehicle state analysis system for a vehicle with an engine, comprising:
   means for estimating a brake specific fuel consumption under remaining running conditions based on generic brake specific fuel consumption characteristic data and a known actual brake specific fuel consumption under a certain running condition of the engine, and for generating an engine performance map which specifies the relation between the running conditions and the brake specific fuel consumption, means for computing the brake specific fuel consumption of the engine by looking up the engine performance map based on the running conditions of the vehicle being analyzed, means for computing a fuel consumption amount from the computed brake specific fuel consumption and engine output, and means for computing the fuel consumption rate from the computed fuel consumption amount and vehicle running distance.

2. The system as defined in claim 1, wherein:

the generic brake specific fuel consumption characteristic data is selected according to the torque pattern of the engine from previously provided brake specific fuel consumption characteristic data corresponding to plural torque patterns.

3. The system as defined in claim 1, wherein:

the optimum best specific fuel consumption is used as the known actual brake specific fuel consumption.

4. The system as defined in claim 1, further comprising means for displaying the computed fuel consumption rate.

5. The system as defined in claim 4, further comprising:

means for computing the drive force of the vehicle, means for computing a running resistance based on a vehicle weight, rolling resistance coefficient and vehicle speed, means for computing an excess drive force by subtracting the running resistance from the drive force, and means for displaying the computed excess drive force.

6. The system as defined in claim 5, further comprising:

means for correcting the vehicle weight when the vehicle is stationary.

7. The system as defined in claim 5, further comprising:

means for correcting the rolling resistance coefficient based on the deceleration degree of the vehicle when the accelerator is off and the clutch is released.

8. The system as defined in claim 5, further comprising:

means for recording the computation results on a recording medium, and means for displaying the computation results recorded on the recording medium after running of the vehicle.

9. The system as defined in claim 4, further comprising:

means for determining hard braking or hard acceleration based on the vehicle acceleration, and means for emitting an alarm when it is determined that there was hard braking or rapid acceleration.

10. The system as defined in claim 1, further comprising means for correcting the brake specific fuel consumption data of the engine performance map based on a comparison of the computed fuel consumption amount and the fuel supply amount when fuel is supplemented.

11. The system as defined in claim 1, wherein:

torque data is stored together with the brake specific fuel consumption data in the engine performance map, and the system further comprises means for correcting the torque data of the engine performance map based on a comparison of the engine torque computed based on data measured when the vehicle is running, and the engine torque obtained by looking up the engine performance map.

12. The system as defined in claim 1, wherein:

the means for computing the fuel consumption amount calculates a fuel consumption weight from the brake specific fuel consumption and the engine output, and computes the fuel consumption amount by dividing this by the fuel density, the means for computing the fuel consumption rate computes the fuel consumption rate by dividing the running distance by the fuel consumption amount, and the system further comprises means for correcting the fuel density when the vehicle is stationary.

13. The system as defined in claim 12 further comprising:

means for recording the computation results on a recording medium, and means for displaying the computation results recorded on the recording medium after running of the vehicle.

14. The system as defined in claim 1, further comprising:

means for recording the computation results on a recording medium, and means for displaying the computation results recorded on the recording medium after running of the vehicle.

15. A vehicle state analysis method for a vehicle with an engine, comprises the steps of:

estimating a brake specific fuel consumption under remaining running conditions based on generic brake specific fuel consumption characteristic data and a known actual brake specific fuel consumption under a certain running condition of the engine, and then generating an engine performance map which specifies the relation between the running conditions and the brake specific fuel consumption, computing the brake specific fuel consumption of the engine by looking up the engine performance map based on the running conditions of the vehicle being analyzed, computing a fuel consumption amount from the computed brake specific fuel consumption and engine output, and computing the fuel consumption rate from the computed fuel consumption amount and vehicle running distance.

* * * * *